US011095997B2

(12) United States Patent
Boss et al.

(10) Patent No.: US 11,095,997 B2
(45) Date of Patent: *Aug. 17, 2021

(54) UNDESIRABLE NOISE DETECTION AND MANAGEMENT

(71) Applicant: International Business Machines Corporation, Armonk, NY (US)

(72) Inventors: Gregory J. Boss, Saginaw, MI (US); Michael Bender, Rye Brook, NY (US); Jeremy R. Fox, Georgetown, TX (US); Keerthi E K, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/842,966

(22) Filed: Apr. 8, 2020

(65) Prior Publication Data
US 2020/0280812 A1    Sep. 3, 2020

Related U.S. Application Data

(63) Continuation of application No. 16/289,378, filed on Feb. 28, 2019, now Pat. No. 10,652,679.

(51) Int. Cl.
*H04R 29/00* (2006.01)
*H04L 29/06* (2006.01)

(52) U.S. Cl.
CPC ......... *H04R 29/001* (2013.01); *H04L 65/403* (2013.01); *H04R 2430/01* (2013.01)

(58) Field of Classification Search
CPC .. H04R 29/001; H04R 2430/01; H04L 65/403
See application file for complete search history.

(56) References Cited

U.S. PATENT DOCUMENTS 7,185,054 B1    2/2007  Ludwig et al.
8,428,247 B2    4/2013  Frauenthal et al.
(Continued)

FOREIGN PATENT DOCUMENTS

KR   1020110138094 A    12/2011
WO      2016050107 A1     4/2016

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.
(Continued)

*Primary Examiner* — Andrew L Sniezek
(74) *Attorney, Agent, or Firm* — Mark Bergner

(57) ABSTRACT

A communications management system (CMS) and related method receive registration information related to a plurality of participant systems (PSs) that communicate audio information between themselves. The CMS transmits a unique signal to each of the plurality of PSs that causes each of the plurality of PSs to produce a unique audio signal and detects an undesirable sound (US) in a PS of the plurality of PSs responsive to the transmission of the unique signal. Then, responsive to the detection of the US, the CMS applies a remedial action to the PS to initiate a reduction in a likelihood that the PS will produce a future US. Finally, the CMS repeats the operations of transmitting, detecting, and applying according to a predefined testing criteria.

20 Claims, 5 Drawing Sheets

(56) References Cited

U.S. PATENT DOCUMENTS

| | | |
|---|---|---|
| 8,804,977 B2 | 8/2014 | Neal et al. |
| 8,942,370 B2 * | 1/2015 | Li et al. |
| 10,652,679 B1 * | 5/2020 | Boss .................... H04L 65/602 |
| 2005/0213517 A1 | 9/2005 | Rodman et al. |
| 2008/0043634 A1 | 2/2008 | Wang et al. |
| 2008/0310328 A1 | 12/2008 | Li et al. |
| 2010/0322387 A1 | 12/2010 | Cutler |
| 2014/0313282 A1 | 10/2014 | Ma et al. |
| 2018/0205353 A1 | 7/2018 | Pogorelik |

OTHER PUBLICATIONS

OFI, "Performance of Round Robin," http://www.isss-sportsurfacescience.org/downloads/documents/1SAQZ8W8Y1_M_ller_OFI_ProficiencyTesting.pdf, ISSS—Technical meeting 2008, Rom, Oct. 16-17, 2008, printed Jan. 8, 2019, 16 pgs.
Boss et al., "Undesirable Noise Detection and Management," U.S. Appl. No. 16/289,378, filed Feb. 28, 2019.
List of IBM Patents or Patent Applications Treated as Related, Signed Apr. 6, 2020, 2 pages.

* cited by examiner

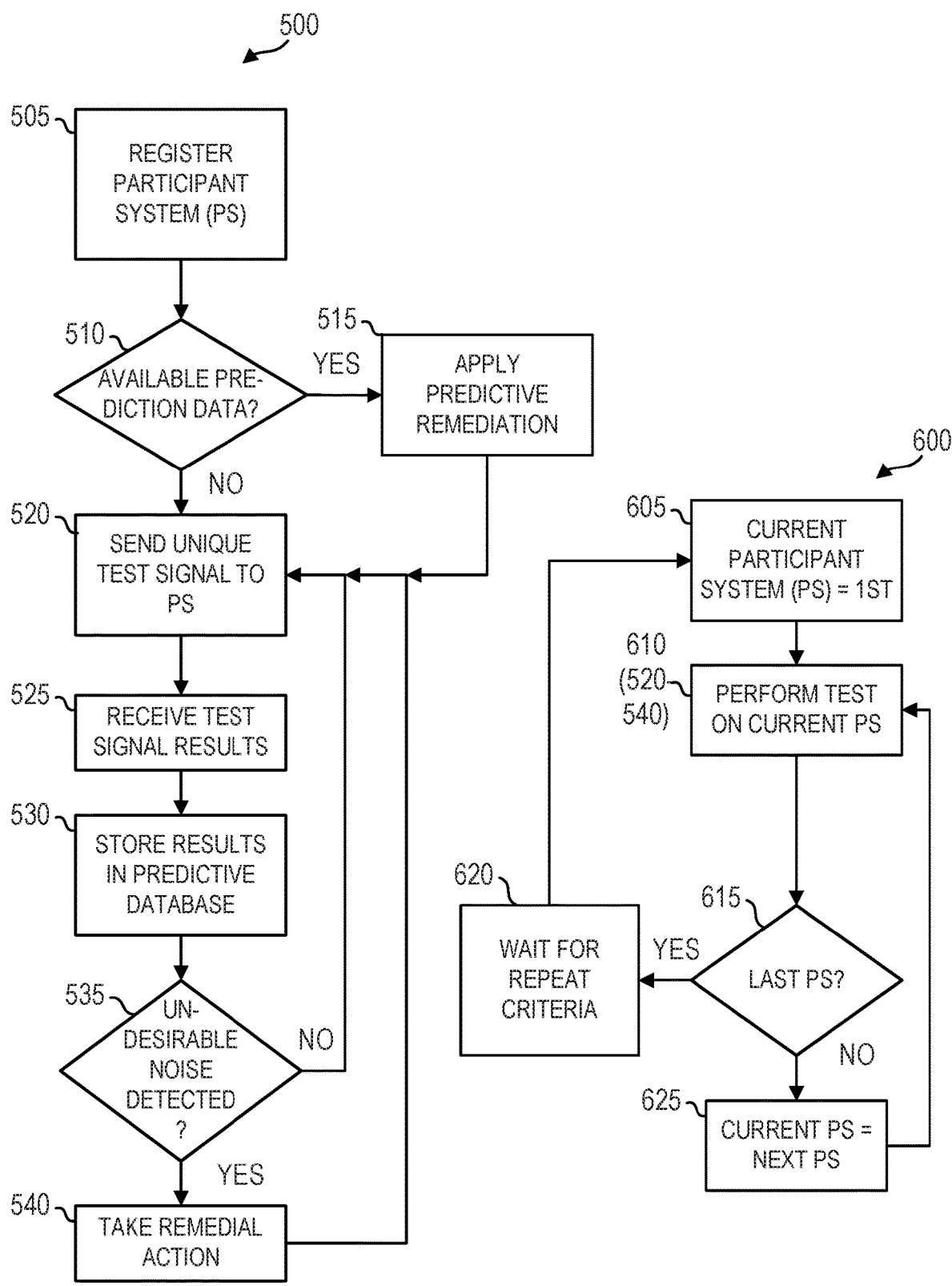

UNDESIRABLE NOISE DETECTION AND MANAGEMENT

BACKGROUND

Disclosed herein is a system for detecting and managing an undesirable noise that may be present in a communications system.

Modern technology has minimized the need for a number of participants in a gathering to be physically present. Such a gathering may include a meeting, class, training, and the like. Networked computers provide a mechanism for those participating in a gathering to have a much richer participation than in the days when a telephone was the only viable mechanism for remote participation. Tele-conferencing software has proliferated that permits individual participants to hear, speak, see, and share information in a high-quality manner that was difficult and costly in the recent past. However, along with these capabilities arose problems resulting from having larger and larger numbers of participants.

SUMMARY

According to one or more embodiments, a communications management system is provided comprising a memory comprising executable instructions, and a processor configured to execute the instructions that, when executed on the processor, cause the processor to receive registration information related to a plurality of participant systems (PSs) that communicate audio information between themselves. The instructions further cause the processor to transmit a unique signal to each of the plurality of PSs that causes each of the plurality of PSs to produce a unique audio signal. The instructions further cause the processor to detect an undesirable sound (US) in a PS of the plurality of PSs responsive to the transmission of the unique signal. The instructions further cause the processor to, responsive to the detection of the US, apply a remedial action to the PS to initiate a reduction in a likelihood that the PS will produce a future US. Finally, the instructions further cause the processor to repeat the operations of transmitting, detecting, and applying according to a predefined testing criteria.

According to one or more embodiments, a communications management system is provided comprising a memory comprising executable instructions, and prediction database comprising prediction information. The instructions, when executed on the processor, cause the processor to receive registration information related to a participant system (PS) of a plurality of PSs that communicate audio information between themselves. The instructions further cause the processor to predict, according to a predefined likelihood threshold, that an undesirable sound (US) will be present during a conference that the PS is participating in based on the received registration information and the prediction information related to the PS. The instructions further cause the processor to, responsive to a positive prediction of the US, apply a remedial action to the PS to initiate a reduction in a likelihood that the US will be present during the conference prior to an actual detection of the US during the conference.

According to one or more embodiments, a computer-implemented method includes using a processor for an operation of receiving registration information related to a plurality of participant systems (PSs) that communicate audio information between themselves. The method further comprises an operation of transmitting a unique signal to each of the plurality of PSs that causes each of the plurality of PSs to produce a unique audio signal. The method further comprises the operation of detecting an undesirable sound (US) in a PS of the plurality of PSs responsive to the transmission of the unique signal. The method further comprises the operation of responsive to the detecting of the US, applying a remedial action to the PS to initiate a reduction in a likelihood that the PS will produce a future US. The method further comprises the operation of repeating the operations of the transmitting, detecting, and applying according to a predefined testing criteria.

According to one or more embodiments, a computer program product is provided that comprises a computer-readable storage medium having computer-readable program code embodied on it. The program code allows a processor to, when executed on a processor, execute one or more processes disclosed herein.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The following detailed description may be taken in conjunction with the accompanying drawings, briefly described directly below and discussed in more detail in the following

FIGS. 5A & B are flowcharts illustrating example processes according to one or more embodiments disclosed herein.

DETAILED DESCRIPTION

Figure 1:
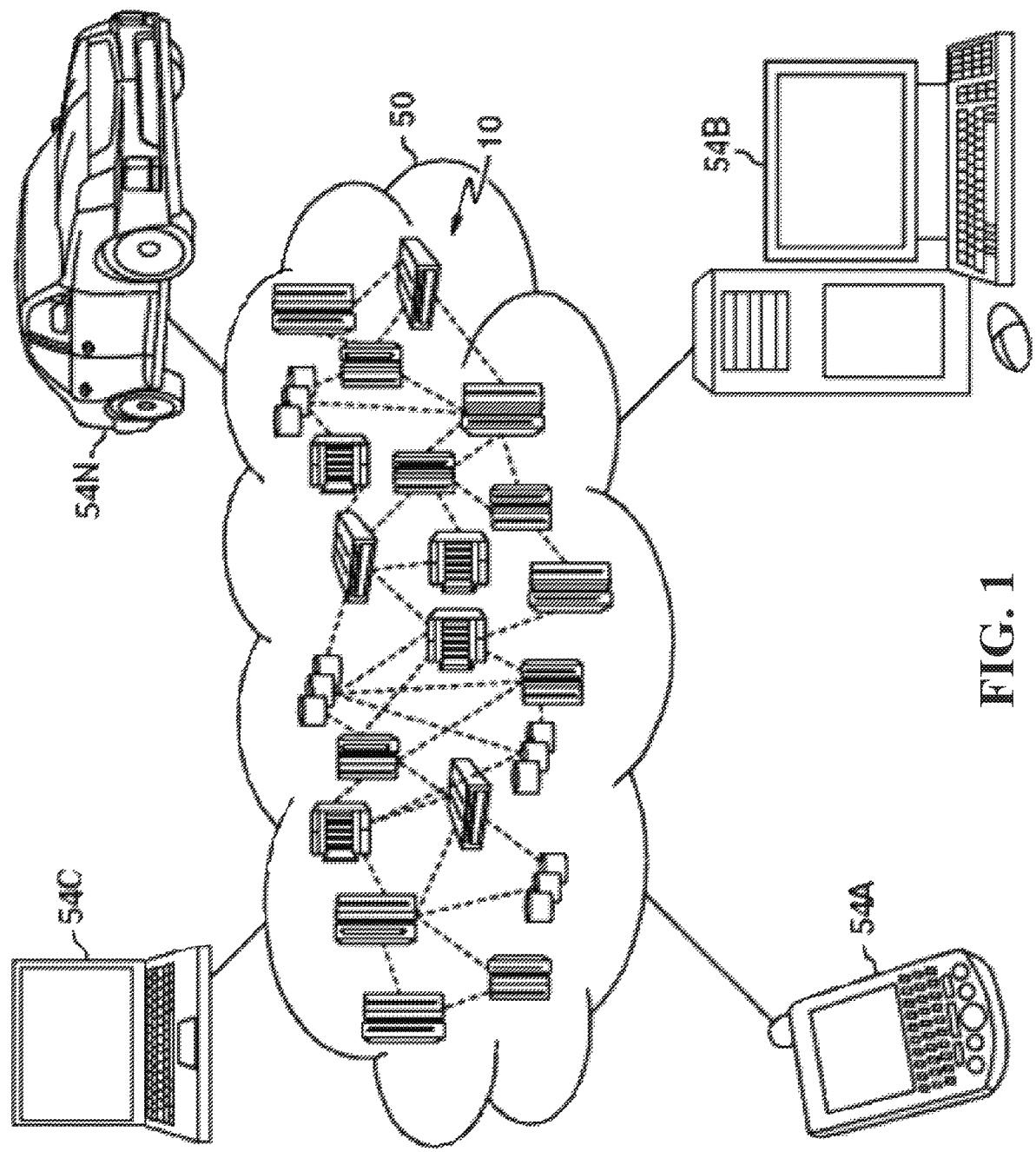
FIG. 1 depicts a cloud computing environment according to an embodiment of the present invention.

The following acronyms may be used below:
ADSL asymmetric digital subscriber line
AEUD authorized end user device
ARM advanced RISC machine
ASP application service provider
CD-ROM compact disc ROM
CMS communications management system
CoD capacity on demand
CPU central processing unit
CUoD capacity upgrade on demand
DPS data processing system
DSLAM digital subscriber line access multiplexer
DSU/CSU data service unit/channel service unit
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network LTA logging/tracking/audit
NSP network services provider
PaaS platform as a service
PABX private automatic branch exchange
PDA personal digital assistant
PLA programmable logic arrays
POTS plain old telephone system
PS participant system
PSTN public switched telephone network
RAM random access memory
RISC reduced instruction set computer
ROM read-only memory
SaaS software as a service
SLA service level agreement
SRAM static random access memory
TDU tagged data unit
UR usage receiver
WAN wide-area network It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
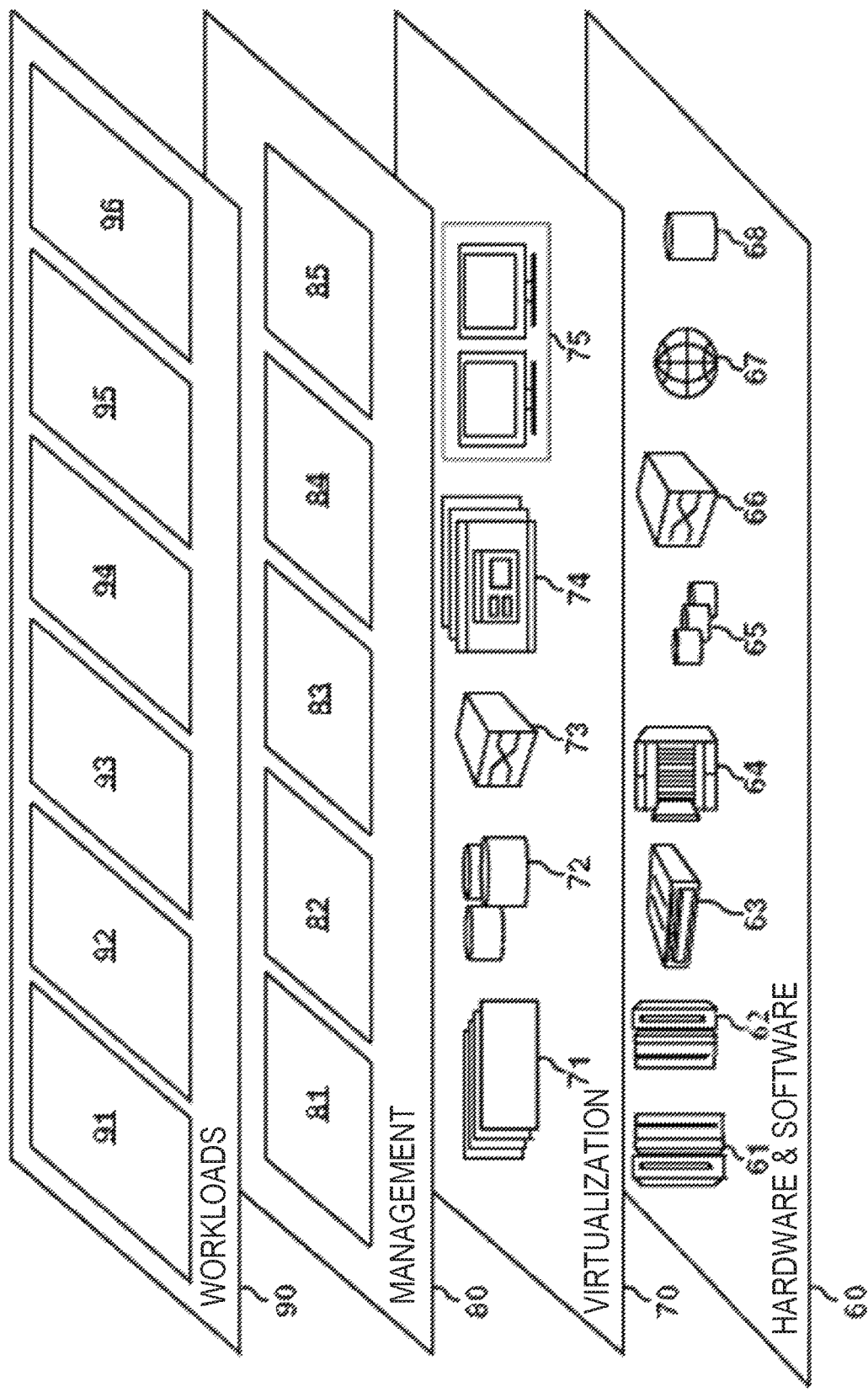
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social networking and e-commerce 96, and the like.

Figure 3:
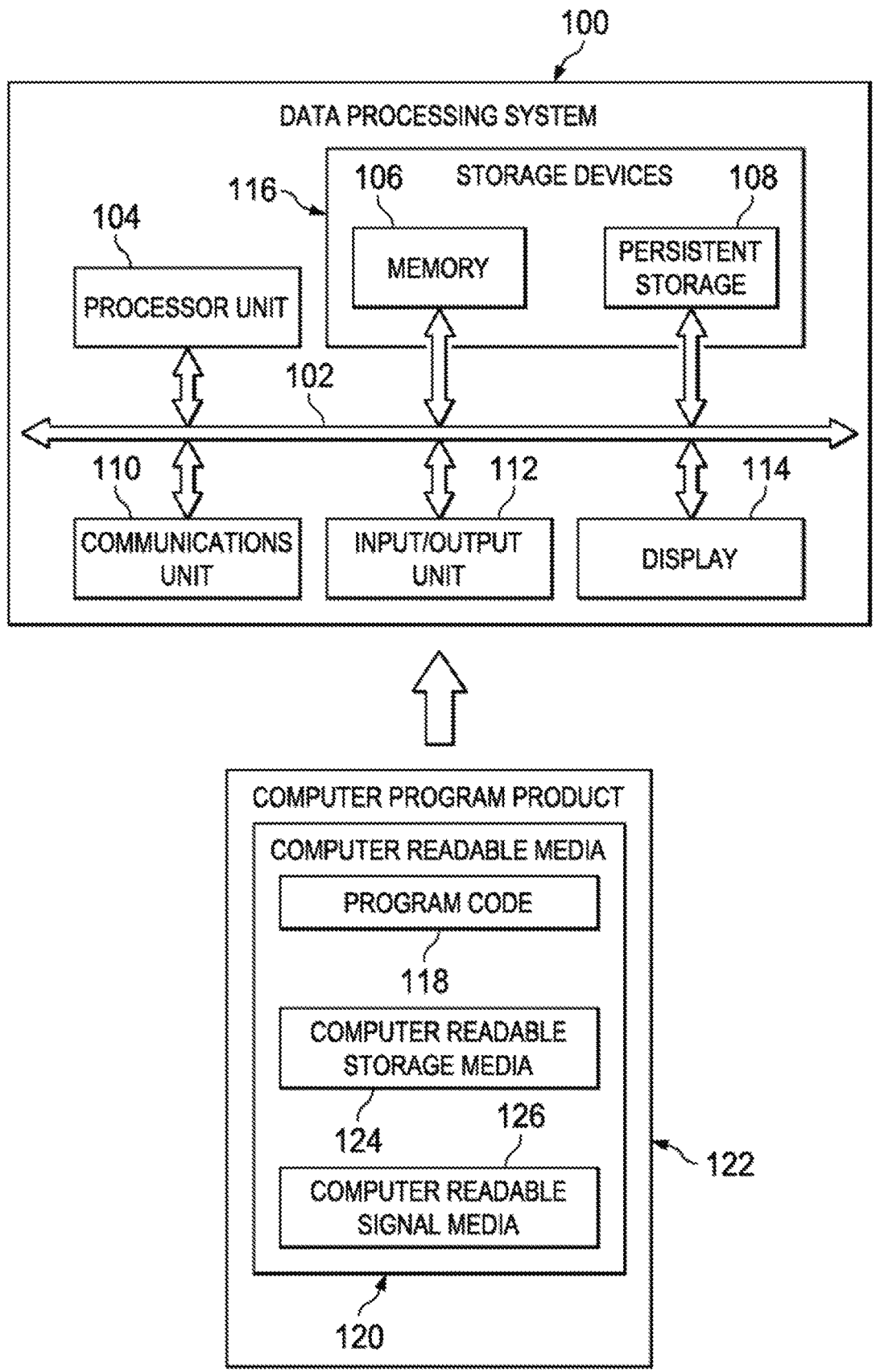
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage (e.g., non-transient memory) 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1 may be varied from the illustrative examples shown.

One of the problems resulting from having a number of participants involved in a remote gathering like a conference call is the undesirable noise that may be present in one or more of the participants' sound systems. A frequent type of undesirable noise is in the form of an echo or feedback, which may be present when a sound from one of the speakers is unintentionally fed back into a microphone to create a sound that is at least distracting and at most may make continuation of the gathering impossible if the situation is not rectified. With a number of participants, however, it may be difficult to determine the equipment or participant responsible for creating the problem. It would be beneficial to quickly determine and manage or remediate undesirable noise, such as echo, when it is present in the system with minimal loss in sound quality for the participants. A gathering as herein defined is a gathering of two or more individuals who are able to communicate with one another. A conference and a gathering are used synonymously.

In one or more embodiments discussed below, it may be possible, among other things to discover and further remediate an audible pervasive echo or other undesirable noise during a phone-based conference meeting or other type of electronic gathering that is managed by a communications system. Various techniques may be applied to web based and video-based conferencing. In one or more embodiments, a pervasive echo or other unwanted noise may be detected by utilizing a testing scheme, such as a round-robin type of approach to quickly discover source of the unwanted noise. Based on system observation through various running applications, a baseline of system usage over time may be established, which may subsequently be used to further predict the type of situations that may lead to unwanted noise in the future.

Figure 4:
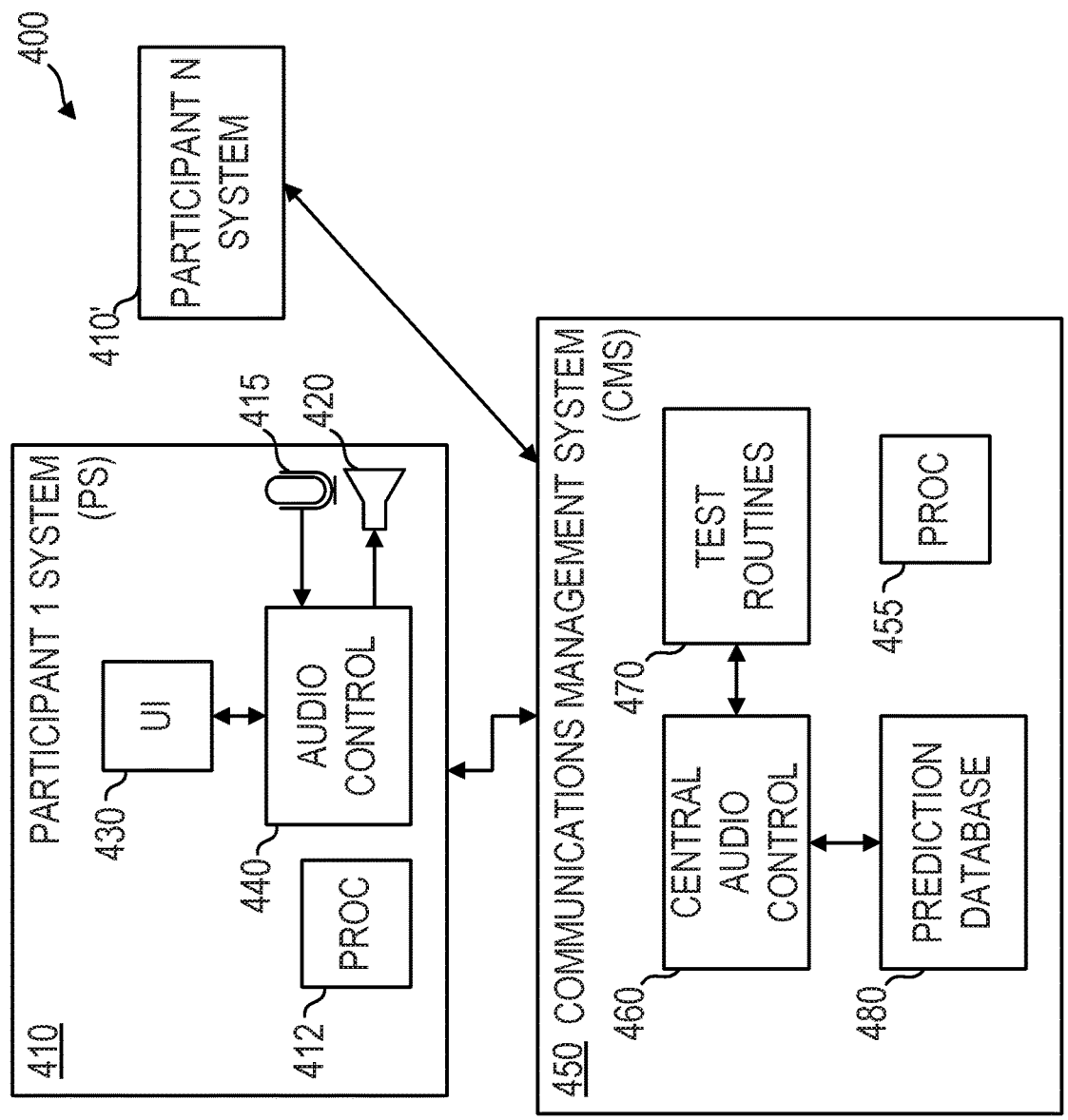
FIG. 4 is a block diagram of an example undesirable noise detection and management system, according to one or more embodiments disclosed herein.

FIG. 4 is a block diagram that illustrates an example of an undesirable noise detection and management system 400 according to one or more embodiments. A number of PSs 410, 410' (or just 410 for the sake of simplicity when a plurality or representative PS(s) is/are being discussed) may be registered for a conference within which participants may engage with and interact with others in the conference. Each PS 410 may be, by way of example, a data processing system 100 as discussed above, and may comprise a processor 412, such as, by way of example, processor unit 104, as discussed above. Each PS 410 may comprise a microphone 415 that receives audio or sound signals from the surrounding area and converts them to electrical signals that may then be communicated within and outside of the PS 410. In some implementations, audio analog signals representing the sound may be converted into digital signals using, for example, analog-to-digital converters and subsequently transferred and processed digitally with, for example, a digital signal processor.

The PS 410 may further have a speaker 420 through which electrical signals containing audio information may be converted into actual sound. Analog signals may be provided as the electrical signals to the speaker 420, but these may have been produced from digital signals that are processed and transferred digitally and that are converted into analog signals using a digital-to-analog converter. The PS 410 may further comprise a user interface 430 comprising user interface elements discussed above, such as a keyboard, display, mouse, and the like.

The PS 410 may be connected to other PSs 410' via a network, such as the Internet. In one implementation, conferencing software may be utilized to assist in the creation of conferences or other gatherings and provide capabilities such as security (e.g., ensuring that the participant is an intended participant of the conference), sharing (e.g., sharing a screen, files, etc. with other participants), recording (e.g., for later viewing), and any number of other capabilities. Such conferencing software may be provided in a client-server architecture, with a portion of the software residing on the CMS 450, and a portion residing on the PS 410. This, or other architectures may utilize a web browser as a portal for accessing the functionality of the conferencing software. The CMS 450 may also utilize cloud-based technologies in order to maximize efficiencies and obtain other benefits of the cloud architecture.

Testing and Detection

The CMS 450 may serve to detect or monitor and control various aspects of the conference to, among other things, help ensure that a positive communication experience for each of the participants is maximized, and may comprise, in one or more embodiments, a data processing system 100 as described above, and may comprise a processor 455, such as the processor unit 104, as described above. In the CMS 450, undesirable sounds, such as echo and feedback mentioned above, may be detected and remediation applied where possible. To do that, the CMS 450 may comprise a central audio control 460 that may be used to receive audio from and send audio to the PSs 410 and possibly implement various controls on the audio, such as volume control, filtering, and the like. The central audio control 460 may thus include various controls for the audio on its end even when the PS 410 offers little in the way of an ability for the CMS 450 to control its audio. The audio from each PS 410 may be received, adjusted, combined with the audio from other PSs 410', and redistributed back to the PSs 410.

The interface mechanisms between the CMS 450 and the PS 410 may vary considerably in terms of communication and control. The audio on some of the PSs 410 may be fairly unsophisticated. For example, a PS 410 may simply make use of a telephone that calls into a number that serves as a conference audio hub on the CMS 450. In other cases, the audio on other PSs 410 may allow for complete control of the audio or signal representations of the audio on either the PS or on the CMS 450 and from either system, including the application of advanced filtering and the like. Thus, in one implementation, the CMS 450 may be flexible in handling the different PSs 410 according to their capabilities.

In one or more embodiments, the CMS 450 may comprise a set of test routines 470 that may be utilized in determining if one of the PSs 410 has or is likely to have an undesirable noise problem, and if so, what options are available for providing remedial action. When a sound may be directed by the CMS 450 to individual PSs 410, e.g., via an audio communications channel, the CMS 450 may attempt to detect problematic PSs 410 by transmitting a test signal, such as an audio microburst, to the speaker 420, of the PS 410 under test. It is generally better if the sound is as unobtrusive to the conferencing audio as possible. This may be achieved by keeping the sound short. For example, a short-burst sound of 100 ms or less is unlikely to interfere with normal communications if it is not sent too frequently.

In one implementation, the unobtrusive sound may be sent in a frequency range that is outside of normal hearing, such as above 20 kHz or below 20 Hz, or that is generally inaudible to the human ear. The term "generally inaudible" means not noticeably audible to listeners in a context of a conference and other audio signals. By way of illustrative example, a 15 kHz signal may be audible to a listener under the best of circumstances, however, in a context of listening to speech and other audio in a much lower frequency range in a conference setting, a listener may not notice a 15 kHz signal that might otherwise be detectable in a dedicated environment.

However, such techniques may be limited by the frequency response of the speaker 420 itself—a small speaker may not be able to reproduce low frequencies well; use of a narrow-band audio system, such as the telephone system, may not work in this manner at all. In addition to frequency, a series of pulses or tones may be utilized as the unique signal sent as a test signal. In one or more embodiments, this unique test signal sent to, for example, each PS 410 participating in a conference is unique and distinguishable from test signals sent to other PSs 410'.

When the test routines 470 receive a feedback signal from a participant system 410, the test routines 470 may know what the origin of the feedback signal is, based on the signal's unique signature. By way of a simplistic use case illustration, if there are three PSs 410 in a conference call, the CMS 450 may send out a single-pulse signal to the first PS 410, a double-pulse signal to the second PS 410, and a triple-pulse signal to the third PS 410. If the double-pulse signal is heard back in an echo, then the CMS 450 may determine that the second PS 410 is responsible for the echo. An echo, reverberation, noise, distortion, or any other undesirable noise may be detected based on test signal volume levels, frequency characteristics, timing, and/or any other signal processing technique.

When multiple PSs 410 are located proximate to one another, such as might be found in an office area, it may be possible that the sound from one PS's speaker 420 ends up in not only their own microphone 415, but microphones of other nearby PSs 410'. In such a situation, the remedial action of reducing the speaker 420 volume based on the test signal received may still be applied to address the problem. Hence, in one or more embodiments, a detection of the same undesirable noise may be present in the microphone 415 of more than one PS. The test routines 470 may be able to detect the proximity of other users that may contribute to an echo effect, such as those that are on a same conference bridge or located in a same or adjacent conference room or predict that such proximate locations are likely to case undesirable noise, such as echo.

In the implementation discussed above, a unique test signal may be sent to each PS 410 (also referred to herein as "scanning") in, for example, a round-robin manner so that every PS 410 receives its unique test signal. The unique test signal may be actual audio data, or it may be data that permits audio data to be generated in a particular manner on the PS 410. The round-robin testing of all stations may be performed in response to any number of criteria, including expiration of a timer (which may be a repeatable timer resulting in periodic testing of all PSs 410), detection of an undesirable noise, a user request, or any other criteria. The ordering of the testing may depend on order of entrance into the conference, a predefined ordering, or an ordering based on a likelihood of creating problems, based on a prediction mechanism discussed in more detail below.

In addition to a round-robin approach, certain PSs 410 may be tested more frequently than others. For example, a PS 410 with potentially more problematic equipment or with a history of problematic behavior may be tested more frequently than other PSs 410 without such known or predicted problems. Additionally, where audio channels among the PSs 410 are connected to the CMS 450 in parallel, it may be possible for the CMS 450 to send out multiple test signals in parallel, thus reducing an amount of time required to send the test signals to all PSs 410. A common audio channel may be utilized for such parallel test signals, as long as they can be clearly distinguished when sent out simultaneously. For example, differing frequencies for test signals may be sent out simultaneously and a returned undesirable noise, such as echo, may be detected based on frequency. In such cases, it may be desirable to use non-harmonic frequencies, since harmonic components may be a part of the distortion or echo that is created.

When the PS 410 initially registers with the conference (or with the CMS 450 outside of the context of a conference), registration information may be collected by the CMS 450 about the PS 410. This information may include a unique identifier for the PS 410, such as a telephone number, network address, location, along with information and/or current settings about versions of software, hardware, and associated drivers that may be present on the PS 410. Also, information may be provided about the conferencing or other communications capabilities of the PS 410, such as the ability to accept remote control of audio or communications parameters. The test signal may also be sent to the PS 410 during or upon completion of its registration.

When the undesirable noise is based on a test signal created by the CMS 450, it may be relatively easy and quick to determine the source of the unwanted noise that is in a form of an echo, reverberation, distortion, or the like. However, it is possible that an undesirable noise is not in this form and is not determinable by use of a test signal. Such a situation may be present when the undesirable noise is a hum, background noise, or the like. In such instances, it may still be possible to determine a source of the noise. For example, if audio signals are received by the CMS 450 in dedicated and isolated channels, then a PS 410 audio channel may be used to determine a source of the undesirable noise. For example, the presence of a 60 Hz hum may be detectable in a channel of a particular PS 410. In another implementation, the CMS 450 may briefly mute all but one of a PS 410 and listen for the undesirable noise to determine the offending PS 410. Just as the test signal may be employed in a round-robin or other scheme described above, the all-but-one-muting may be employed in a similar manner.

The determination as to whether a particular PS 410 is producing an undesirable noise, such as an echo or reverberation, may be performed using various statistical techniques. In one implementation, if the conference size is less than thirty participants, a Student's t-test may be used to identify a PS 410 that is statistically likely to be the source of the undesirable noise. If the conference size is greater than or equal to thirty persons, then a Z-test may be used to make the same determination. The determination may be made by looking for outliers or anomalies for the target sound in the sample audio conference using, e.g., Cochran's C test and Grubb's test. Other statistical techniques, including regression models and hypothesis testing and complex multi-variate analyses, or other clustering or grouping techniques, may be used to identify one or more PSs 410 as an actual or potential source of undesirable noise. By way of example, a threshold limit on the volume level may be set to help identify whether a loudness of each audio line is above the threshold.

The application of different remedial actions may be taken based on a level of detection of the undesirable noise. By way of example, the detection of the undesirable noise may involve applying a test that is the t-test or the Z-test. If the value of the test is conditioned upon a first level of detection, such as the test result is greater than two, then this may be interpreted as a "warning signal" that triggers a first remedial action (e.g., messaging or minor volume adjustment), and if the value of the test is conditioned upon a second level of detection, such as the test result is greater than three, then this may trigger a second remedial action, e.g., an "action signal" that triggers a second set of actions (e.g., muting the microphone). Outliers may be utilized to help detect the variance in the echo. As someone skilled in the art would know, analysis of the signals, outliers, and threshold limits may be utilized to further refine the statistical analyses.

Remedial Action

When an undesirable noise, such as an echo, is detected, remedial action may be taken. Remedial action may vary based on capabilities of the PS 410 as well as desired operational characteristics of a coordinator/manager for a gathering. Basic elements of remedial action may involve providing indications and warnings, or causing the audio to be modified in some manner. Indications and warnings may be utilized when an ability to modify the audio is difficult, or possibly utilized in addition to modifying the audio. When a PS 410 has been identified as a source of undesirable noise, the CMS 450 may sent a message for display on the UI 430 of the PS 410 indicating a type of undesirable noise (echo, reverb, distortion, hum, background noise, and the like), and possibly recommending a remedial action for the participant to take on his/her system (mute microphone, turn down microphone, turn down speaker, use headphones, etc.). The message may be sent in text, graphic, audio, video, or any other format suitable for notifying the participant. A message may alternately or additionally be sent to a gathering organizer of manager.

In the event that a modification of the audio is displayed, an indication may be provided to the participant as to the nature of the adjustment that was made. For example, the CMS 450 may detect an echo in the PS 410 and reduce the microphone level. It may then send a message in a form of a pop-up window or other form stating, e.g., "An echo was detected on your system and your microphone level was reduced [by 10 dB, 25%, etc.]." In this way, the participant may understand why the PS 410 is acting differently and may wish to consider making adjustments (e.g., moving the speakers further from the microphone, wearing headphones, etc.).

Adjustment of the audio may be done on either the PS 410 side or on the CMS 450 side. Where the CMS 450 gathers and redistributes the audio for a conference call, it may be beneficial for the CMS 450 to adjust either the incoming sound originating from the microphone 415 of the offending PS 410, or adjust the outgoing sound directed to the speaker 420 of the offending PS 410. However, this configuration may become demanding on a CMS 450 for which many PSs 410 are participating. Thus, it may also be beneficial in certain situations to adjust incoming or outgoing sound on the PS 410 using its audio control 440.

The adjustments may be provided in the form of volume adjustments either to the microphone 415 (or signal from the microphone 415) or the speaker 420 (or signal to the speaker 420). Such an adjustment may be made to the point of muting the microphone 415 or the speaker 420. A determination may be made as to which adjustment is likely to be more effective. For example, if a PS 410 speaker 420 is creating a feedback loop or echo in an adjacent participant's system 410', then a volume adjustment to the speaker 420 may be in order. Conversely, if a PS 410 has a very sensitive or omnidirectional microphone 415, the volume adjustment to the microphone may be performed. Another adjustment that may be made to the microphone 415, where possible, is to adjust the directionality of the microphone 415 so that it reduces audio from directions that are not along a directional lobe of the microphone 415. Where present, the adjustment may be in the form of switching speakers or microphones, where alternates are available.

Another adjustment that may be made is to perform filtering. For example, if characteristics of the audio system are such that only high frequency or low frequency signals create a feedback problem, then appropriate filters may be applied to reduce the undesirable noise without otherwise sacrificing audio quality. Any form of known filter may be applied, such as high-pass, low-pass, band-pass, band reject, and filters may be applied in combination. The test routines 470 may make various adjustments on components on the system and then determine a level of success or failure of that adjustment in order to determine future adjustments that may be made. Details may be stored in a persistent or prediction database 480 for subsequent use.

By way of an illustrative use case example, the test signal is sent and an echo is detected in a PS 410 and the remedial measure is initially determined to be reducing the speaker 420 volume by −10 dB. A second test signal is sent and, although the echo is reduced, it is still detected to be present. The remedial measure is to reduce the speaker 420 volume by an additional −10 dB, and the echo is no longer detected in response to the test signal. The information "reduce speaker value by −20 dB for this PS 410 in the future" may be stored in the prediction database 480 so that this may be applied to the PS 410 when it initially connects to the CMS 450 or possibly in response to a first detection of an undesirable noise for that PS 410 (i.e., making the −20 dB adjustment in a single round, as opposed to the two −10 dB rounds previously used). In this way, a faster, simpler, and more effective remediation action may be applied.

Predictive Detection

The CMS 450 may use the prediction database 480 in order to anticipate the potential presence of undesirable noise and possibly preemptively prevent it from occurring. As information is acquired about equipment/hardware, software, users, location, and other parameters related to PSs 410 are determined by the CMS 450, along with measurements taken in response to the above-describe tests and/or various remedial actions, this information, including both positive and negative responses to testing, may be stored in the prediction database 480. Thus, when a PS 410 registers for a conference with the CMS 450 and provides its registration information, this registration information may be compared to information in the prediction database 480 to determine whether there is a historical indication of potential problems associated with the hardware, software, user, location, or any other attributes associated with the PS 410.

Based on a statistical analysis of information in the prediction database 480 in conjunction with the registration information provided, it may be possible to take remedial action even prior to the PS 410 being connected in with the rest of the conference. By way of a use case example, an individual has both an older and a newer laptop that they use to connect into conferences. The older computer has a lower quality microphone and speaker that are located close to one another. Historically, use of this older computer as the PS 410 has resulted in echoing. In four out of the last five times the user has used this older computer as the PS 410, problematic echoing has been detected. An identifier associated with this computer has been stored in the prediction database 480, along with the problems and, if available, the effective remediation (e.g., "reduce the microphone 420 gain by −20 dB").

When the user registers to join a conference with the older computer as the PS 410, the CMS 450 reads, among other things, a unique identifier for the computer and finds this computer in the prediction database 480. With the statistical analysis, the CMS 450 may determine preemptively to adjust the microphone gain by −20 dB prior to allowing the PS 410 to join the conference (or, in an implementation, shortly after joining, or when the user begins to speak into the microphone, or at any other similar time). In one implementation, such preventative action may not require a specific unique instance to match in the prediction database 480, but rather a type match may suffice. For example, if a particular model sound card has been known to cause problems in the past, similar remedial action may be taken upon detection of that model sound card in the user's computer, despite the fact that that particular instance of the sound card has never been involved in a problematic participation. These types of statistical analyses may be performed for any factor associated with the PS 410 or any groups of factors when the prediction database 480 has an adequate number of samples or related information for making a determination that remedial action may be helpful. Continuing on with the use case, the user's new computer has no similar history of problematic participation in the conference, and thus, no preemptive activities are applied as they were when the user's old computer was used as the PS 410.

Processes

FIGS. 5A and 5B are flowcharts illustrating process components according to one or more embodiments disclosed herein. FIG. 5A illustrates a process 500 for running and taking remedial action of a test on a single PS 410. At operation 505, a PS 410 may register to participate in a conference with the CMS 450, and provide registration information to the CMS 450. A PS 410 may also pre-register with the CMS 450 prior to a conference to provide registration information that may be similar to or differ from the registration information provided for an existing conference.

Once the CMS 450 has received the registration information from the PS 410, it may, in operation 510, search the prediction database 480 to determine if any predictive data exists that may be applicable to the PS 410 participating in the conference. If not (operation 510: NO), then processing proceeds to operation 520, otherwise, operation 515 may be performed first, which is to apply any predictive remediation based on information in the prediction database 480. In operation 520, a unique test signal may be sent from the CMS 450 to the PS 410, and in operation 525, the CMS 450 may listen for any results received in response to the test signal. Any results received in response to the test signal (success, fail, problem, parameters, etc.) may be stored, in operation 530, in the prediction database 480 for potential subsequent use. In operation 535, a test may be performed, using any of the techniques described herein, to determine if an undesirable noise us detected. If not (operation 535: NO), then at some later point in time, the process 500 loops to operation 520 to repeat sending the test signal, receiving a response, and testing the response. If so (operation 535: YES), then in operation 540, remedial action, as described herein, may be taken and the process 500 loops to operation 520.

FIG. 5B illustrates a process 600 for the CMS 450 to test a plurality of the PSs 410 participating in a conference. The process 600, as described herein, may be triggered by any number of triggering events, such as expiration of a timer, e.g., a periodic timer, a detection of an unwanted noise, a user request, or any other form of trigger. When the process 600 for performing an overall test is initiated, in operation 605, a current PS is set as a first PS 410. As described above, the ordering of the PS 410 for testing may be according to order of entry by the PS 410 into the conference, a likelihood of creating undesirable noise, a previously detected undesirable noise, or any other priority scheme. Next, in operation 610, the operations 520-540 described above are performed. In operation 615, a determination may be made to determine if this is the last PS 410 in the conference. If so (operation 615: YES), then in operation 620, the process 600 waits until the criteria for repeating the test series is met, and when it is, the process 600 may repeat. If not (operation 615: NO), then, in operation 625, the current PS is set to the next PS 410 to be tested, and the testing in operation 610 is repeated. As discussed herein, it is not essential for all PSs 410 to be tested sequentially. Where possible, multiple PSs 410 may be tested concurrently or certain PSs 410, such as those exhibiting problems or likely to exhibit problems, may be tested more frequently.

The one or more embodiments disclosed herein accordingly provide an improvement to computer technology, namely an improvement in computer-networked conferencing audio so that permits multiple participants in a gathering to avoid potential feedback problems that may disrupt a networked conference.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for a communications management system (CMS), the computer program product comprising a computer readable storage medium having program instructions embodied therewith, the program instructions executable by a processor to cause the processor to:
    receive registration information related to a plurality of participant systems (PSs) that communicate audio information between themselves;
    transmit a unique signal to each of the plurality of PSs that causes each of the plurality of PSs to produce a unique audio signal;

detect an undesirable sound (US) in a PS of the plurality of PSs responsive to the transmission of the unique signal;

responsive to the detection of the US, apply a remedial action to the PS to initiate a reduction in a likelihood that the PS will produce a future US;

repeat the transmitting, detecting, and applying according to a predefined testing criteria; and responsive to the processor of the CMS receiving a positive or negative response to the transmission of the unique signal that indicates, respectively, a presence or absence of the US for a PS associated with the unique signal, storing data related to the positive or negative response as prediction information in a prediction database that is usable to subsequently predict that an undesirable sound (US) will be present during a future conference that the PS is participating in.

2. The computer program product of claim 1, wherein the detection of a US in a PS is performed by determining a statistical likelihood of the PS being a source of the US using a t-test when a population size of the plurality of PSs is thirty or less, and a Z-test when a population size of the plurality of PSs is greater than thirty.

3. The computer program product of claim 1, wherein the detection of a US in a PS is performed by considering outliers or anomalies related to the transmission of the unique signal using a test selected from the group consisting of Cochran's C test and Grubb's test.

4. The computer program product of claim 1, wherein the unique audio signal is selected from the group consisting of: (a) a microburst with a duration of less than or equal to approximately 100 ms, and (b) a frequency that is generally inaudible to the human ear.

5. The computer program product of claim 1, wherein the remedial action is a volume adjustment.

6. The computer program product of claim 5, wherein the volume adjustment is a PS volume adjustment.

7. The computer program product of claim 5, wherein the volume adjustment is a CMS adjustment.

8. The computer program product of claim 5, wherein the volume adjustment is an adjustment to a PS speaker.

9. The computer program product of claim 5, wherein the volume adjustment is an adjustment to a PS microphone.

10. The computer program product of claim 1, wherein the remedial action is a message indicating a US problem.

11. The computer program product of claim 1, wherein the US is an echo.

12. The computer program product of claim 1, wherein the application of a remedial action comprises:

an application of a first remedial action conditioned upon a first level of detection of the US; and an application of a second remedial action that differs from the first remedial action conditioned upon a second level of detection of the US.

13. A computer program product for a communications management system (CMS), the computer program product comprising a computer readable storage medium having program instructions embodied therewith, the program instructions executable by a processor to cause the processor to:

receive registration information related to a participant system (PS) of a plurality of PSs that communicate audio information between themselves;

predict, according to a predefined likelihood threshold resulting in a positive determination, that an undesirable sound (US) will be present during a conference that the PS is participating in based on the received registration information and a historical indication of potential problems in prediction information associated with the PS; and responsive to a positive prediction that the US will be present during the conference, preemptively and prior to the presence of the US, apply a remedial action to the PS to initiate a reduction in a likelihood that the US will be present during the conference prior to an actual detection of the US.

14. The computer program product of claim 13, wherein the remedial action is applied prior to or at a start of participation of the PS in the conference.

15. The computer program product of claim 13, wherein the processor is further configured to:

transmit a unique signal to each of the plurality of PSs that causes each of the plurality of PSs to produce a unique audio signal;

detect an undesirable sound (US) in a PS of the plurality of PSs responsive to the transmission of the unique signal;

responsive to the detection of the US, apply a remedial action to the PS to initiate a reduction in a likelihood that the PS will produce a future US;

repeat the transmitting, detecting, and applying according to a predefined testing criteria.

16. The computer program product of claim 15, further comprising, responsive to the processor of the CMS receiving a positive or negative response to the transmission of the unique signal that indicates, respectively, a presence or absence of the US for a PS associated with the unique signal, storing data related to the positive or negative response as prediction information in a prediction database that is usable to subsequently predict that an undesirable sound (US) will be present during a future conference that the PS is participating in.

17. The computer program product of claim 15, wherein the prediction information comprises data related to positive and negative responses that indicate, respectively, a presence or absence of the US for a PS associated with the unique signal to prior transmissions of a unique signal in prior conferences with respect to factors selected from the group consisting of hardware, software, user identity, and location.

18. A computer-implemented method for managing a communications management system (CMS), the method comprising, using a processor for:

receiving registration information related to a participant system (PS) of a plurality of PSs that communicate audio information between themselves;

predicting, according to a predefined likelihood threshold resulting in a positive determination, that an undesirable sound (US) will be present during a conference that the PS is participating in based on the received registration information and a historical indication of potential problems in prediction information associated with the PS; and responsive to a positive prediction that the US will be present during the conference, preemptively and prior to the presence of the US, applying a remedial action to the PS to initiate a reduction in a likelihood that the US will be present during the conference prior to an actual detection of the US.

19. The method of claim 18, wherein the remedial action is applied prior to or at a start of participation of the PS in the conference.

20. The method of claim 18, further comprising:
transmitting a unique signal to each of the plurality of PSs that causes each of the plurality of PSs to produce a unique audio signal;
detecting an undesirable sound (US) in a PS of the plurality of PSs responsive to the transmission of the unique signal;
responsive to the detection of the US, applying a remedial action to the PS to initiate a reduction in a likelihood that the PS will produce a future US;
repeating the transmitting, detecting, and applying according to a predefined testing criteria.

\* \* \* \* \*